(12) United States Patent
Lasnier

(10) Patent No.: US 10,607,407 B2
(45) Date of Patent: Mar. 31, 2020

(54) DYNAMICALLY MODIFYING VISUAL RENDERING OF A VISUAL ELEMENT COMPRISING A VISUAL CONTOURING ASSOCIATED THEREWITH

(71) Applicant: CAE Inc., Saint-Laurent, QC (CA)

(72) Inventor: Sylvain Lasnier, Saint-Laurent (CA)

(73) Assignee: CAE Inc., St-Laurent (CA)

(*) Notice: Subject to any disclaimer, the term of this patent is extended or adjusted under 35 U.S.C. 154(b) by 145 days.

(21) Appl. No.: 15/941,951

(22) Filed: Mar. 30, 2018

(65) Prior Publication Data

US 2019/0304177 A1    Oct. 3, 2019

(51) Int. Cl.

| | | |
|---|---|---|
| G09B 9/30 | (2006.01) | |
| G06T 17/20 | (2006.01) | |
| G06T 9/20 | (2006.01) | |
| G06T 15/20 | (2011.01) | |
| G06T 19/20 | (2011.01) | |
| G09B 9/10 | (2006.01) | |
| G09B 9/36 | (2006.01) | |
| G09B 9/00 | (2006.01) | |

(Continued)

(52) U.S. Cl.
CPC ............ *G06T 17/20* (2013.01); *G06T 9/20* (2013.01); *G06T 15/205* (2013.01); *G06T 19/20* (2013.01); *G09B 9/006* (2013.01); *G09B 9/10* (2013.01); *G09B 9/302* (2013.01); *G09B 9/36* (2013.01); *G06T 2215/16* (2013.01); *G09B 9/003* (2013.01); *G09B 9/04* (2013.01); *G09B 9/063* (2013.01)

(58) Field of Classification Search
CPC ....... G06T 17/20; G06T 19/20; G06T 15/205; G06T 9/20; G06T 2215/16; G09B 9/302; G09B 9/006; G09B 9/36; G09B 9/10; G09B 9/063; G09B 9/003; G09B 9/04
See application file for complete search history.

(56) References Cited

U.S. PATENT DOCUMENTS

| | | | | |
|---|---|---|---|---|
| 2008/0103639 A1* | 5/2008 | Troy | ................... | G05D 1/0027 701/2 |
| 2009/0076665 A1* | 3/2009 | Hoisington | .......... | G05D 1/0044 701/2 |

(Continued)

*Primary Examiner* — Phuoc Tran
(74) *Attorney, Agent, or Firm* — Benoit Yelle; Gowling WLG (Canada) LLP

(57) ABSTRACT

Method and system for dynamically modifying, in an interactive computer simulation station, visual rendering of a visual element in a computer generated environment from an interactive computer simulation. Pre-defined visual characteristics comprise a visual contouring associated with the visual element. The method comprises receiving, via a tangible instrument module, one or more commands for controlling a simulated vehicle. The method also comprises dynamically affecting the visual contouring of the visual element considering at least one of a distance factor between the simulated vehicle and the visual element in the computer generated environment and a relative contrast between the pre-defined visual characteristics of the visual element and underlying computer generated environment elements. The distance factor and the relative contrast are determined in real-time during execution of the interactive computer simulation prior to rendering the visual element for display.

20 Claims, 9 Drawing Sheets

(51) Int. Cl.
*G09B 9/04* (2006.01)
*G09B 9/06* (2006.01)

(56) References Cited

U.S. PATENT DOCUMENTS

2009/0276105 A1* 11/2009 Lacaze ................. G05D 1/0044
 701/2
2016/0167567 A1* 6/2016 Foltin .................... B60Q 1/085
 315/82

* cited by examiner

DYNAMICALLY MODIFYING VISUAL RENDERING OF A VISUAL ELEMENT COMPRISING A VISUAL CONTOURING ASSOCIATED THEREWITH

TECHNICAL FIELD

The present invention relates to improved interactive training and, more particularly, to improved immersive interactive training using a simulation station.

BACKGROUND

An interactive computer simulation system performs one or more interactive computer simulations. Each interactive computer simulation comprises one or more virtual simulated elements each representing an actual system (e.g., multiple virtual aircraft systems each representing an actual aircraft). Each interactive computer simulation provides a virtual computer generated environment and various tangible instruments (or controls) in a simulation station to allow enactment of different scenarios for the purpose of training one or more users (or trainees), using one or more of the virtual simulated elements, in the operation and/or understanding of the corresponding one or more actual systems. The virtual simulated element, or simulated element, is defined herein as a simulated system. The simulated element is a virtual version that simulates, to the extent required by the interactive computer simulation, behavior of an actual system. The various tangible instruments accessible to the one or more users in the simulation station replicate actual instruments or otherwise reproduce behavior of the actual instruments found in the actual system.

In certain circumstances, the interactive computer simulation is used to develop and/or measure skills of the trainees in relation to specific benchmarks. By way of example, a Detection-Orientation-Range-Identification (DORI) benchmark has been developed in relation to a trainee's ability to detect and qualify a target within a virtual scene in a flight simulator. The DORI benchmark is particularly useful in air-to-air combat pilot training. It is one example of benchmarks that are based on visual acuity of the trainee. The benchmark is one of different elements of the training that takes place in the interactive computer simulation from within the simulation station. The benchmark is meant to provide a correlation between a trainee's ability as measured and developed in the interactive computer simulation and the actual trainee's ability in the actual systems.

Unfortunately, physical limitations of the simulation station (e.g., image resolution, brightness and/or contrast) lead to benchmark results that are difficult to reliably correlate to actual abilities. The present invention at least partially addresses this concern.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a first aspect in a first set of embodiments of the present invention, a method is provided for dynamically modifying, in an interactive computer simulation station, visual rendering of a visual element in a computer generated environment from an interactive computer simulation. The pre-defined visual characteristics comprise a visual contouring are associated with the visual element. The method comprises receiving, via a tangible instrument module, one or more commands from a trainee of the interactive computer simulation station for controlling, in the computer generated environment, a simulated vehicle of the interactive computer simulation. the method also comprises, upon loading the visual element for display at the interactive computer simulation station, dynamically affecting the visual contouring of the visual element. Dynamically affecting the visual contouring of the visual element is performed considering at least one of a distance factor between the simulated vehicle and the visual element in the computer generated environment and a relative contrast between the pre-defined visual characteristics of the visual element and underlying computer generated environment elements. The distance factor and the relative contrast are determined in real-time during execution of the interactive computer simulation prior to rendering the visual element for display. In some embodiments, dynamically affecting the visual contouring of the visual element is performed considering both the distance factor and the relative contrast.

Optionally, dynamically affecting the visual contouring of the visual element considering the relative contrast may comprise modulating a plurality of pixels surrounding the visual element for obtaining a target contrast level with the underlying computer generated environment elements.

The visual contouring may be provided, in some embodiments, by a hollow three-dimensional mesh associated with the visual element to increase contour thickness of the visual element.

The method may further optionally comprise modifying at least one of the pre-defined visual characteristics of the visual element considering a relative directional vector between the simulated vehicle and the visual element in the computer generated environment and/or one or more pre-identified distinctive visual characteristics of the visual element. Modifying at least one of the pre-defined visual characteristics of the visual element may further optionally be performed by associating a highlighting three-dimensional mesh with the visual element to highlight the one or more pre-identified distinctive visual characteristics of the visual element. Alternately, or in addition, modifying the at least one of the pre-defined visual characteristics of the visual element maybe performed by applying one or more tailoring parameters determined considering at least one of an identity of the trainee and an identifier of the visual element. In certain embodiments, the one or more tailoring parameters are further applied when dynamically affecting the visual contouring of the visual element is performed.

Optionally, dynamically affecting the visual contouring of the visual element may also be performed by applying one or more tailoring parameters determined considering at least one of an identity of the trainee and an identifier of the visual element.

In accordance with a second aspect in the first set of embodiments of the present invention, an interactive computer simulation station is provided. The interactive computer simulation station comprises a tangible instrument module, a display system and a processor module comprising a dedicated graphics unit.

The tangible instrument module is for receiving one or more commands from a trainee thereof for controlling, in a computer generated environment from an interactive computer simulation, a simulated vehicle in the interactive computer simulation;

The display system is for displaying rendered images of the computer generated environment comprising a visual element having associated therewith pre-defined visual characteristics comprising a visual contouring;

The processor module, comprising the dedicated graphics unit, upon loading the visual element for display at the interactive computer simulation station, dynamically affects the visual contouring of the visual element, The processor module dynamically affects the visual element by considering at least one of a distance factor between the simulated vehicle and the visual element in the computer generated environment and a relative contrast between the pre-defined visual characteristics of the visual element and underlying computer generated environment elements. The processor module determines the distance factor and the relative contrast in real-time during execution of the interactive computer simulation prior to rendering the visual element by the dedicated graphics unit.

In certain embodiments, the processor module may dynamically affect the visual contouring of the visual element considering both the distance factor and the relative contrast.

The processor module may also optionally dynamically affect the visual contouring of the visual element considering the relative contrast by modulating a plurality of pixels surrounding the visual element for obtaining a target contrast level with the underlying computer generated environment elements.

The visual contouring may be provided, in certain embodiments, by a hollow three-dimensional mesh associated with the visual element to increase contour thickness of the visual element.

The processor module may further modify at least one of the pre-defined visual characteristics of the visual element considering at least one of a relative directional vector between the simulated vehicle and the visual element in the computer generated environment and one or more pre-identified distinctive visual characteristics of the visual element. The processor module may further optionally modify the at least one of the pre-defined visual characteristics of the visual element by associating a highlighting three-dimensional mesh with the visual element to highlight the one or more pre-identified distinctive visual characteristics of the visual element. The processor module may also, additionally or alternatively, modify the at least one of the pre-defined visual characteristics of the visual element by applying one or more tailoring parameters determined considering at least one of an identity of the trainee and an identifier of the visual element. The one or more tailoring parameters may also optionally further be applied when the processor module dynamically affects the visual contouring of the visual element.

The processor module may also optionally dynamically affect the visual contouring of the visual element by applying one or more tailoring parameters determined considering at least one of an identity of the trainee and an identifier of the visual element.

In certain embodiments, the one or more tailoring parameters identify, considering the identity of the trainee, the one or more pre-identified distinctive visual characteristics of the visual element from a plurality of visual characteristics thereof. in additional or alternately, the one or more tailoring parameters may specify, considering the identifier of the visual element of the trainee, an advancement value for one or more abilities of the trainee related to detection of the visual element, orientation determination for the visual element, approximate range determination for the visual element and identification of the visual element.

In accordance with a first aspect in a second set of embodiments of the present invention, a method is provided for dynamically modifying, in an interactive computer simulation station, visual rendering of a visual element in a computer generated environment from an interactive computer simulation. One or more pre-identified distinctive visual characteristics are associated with the visual element. The method comprises receiving, via a tangible instrument module, one or more commands from a trainee of the interactive computer simulation station for controlling, in the computer generated environment, a simulated vehicle of the interactive computer simulation. The method also comprises, upon loading the visual element for display at the interactive computer simulation station, dynamically modifying the one or more pre-identified distinctive visual characteristics of the visual element considering at least a relative directional vector between the simulated vehicle and the visual element in the computer generated environment, the relative directional vector being determined in real-time during execution of the interactive computer simulation prior to rendering the visual element for display.

Optionally, dynamically modifying the one or more pre-identified distinctive visual characteristics of the visual element may be performed by associating a highlighting three-dimensional mesh with the visual element to highlight the one or more pre-identified distinctive visual characteristics of the visual element.

The method may optionally further comprise dynamically affecting a visual contouring of the visual element considering at least one of a distance factor between the simulated vehicle and the visual element in the computer generated environment and a relative contrast between the pre-defined visual characteristics of the visual element and underlying computer generated environment elements. Dynamically affecting the visual contouring of the visual element may optionally be performed considering both the distance factor and the relative contrast. Dynamically affecting the visual contouring of the visual element considering the relative contrast may optionally comprise modulating a plurality of pixels surrounding the visual element for obtaining a target contrast level with the underlying computer generated environment elements. The visual contouring may optionally be provided by a hollow three-dimensional mesh associated with the visual element to increase contour thickness of the visual element.

Affecting the visual contouring may, in certain embodiments, be performed by applying one or more tailoring parameters determined considering at least one of an identity of the trainee and an identifier of the visual element. The one or more tailoring parameters may also further be applied when dynamically modifying the one or more pre-identified distinctive visual characteristics of the visual element is performed.

Dynamically modifying the one or more pre-identified distinctive visual characteristics of the visual element may, in certain embodiments, be performed by applying one or more tailoring parameters determined considering at least one of an identity of the trainee and an identifier of the visual element.

In accordance with a second aspect in the second set of embodiments of the present invention, an interactive computer simulation station. The interactive computer simulation station comprises a tangible instrument module, a display system and a processor module comprising a dedicated graphics unit.

The tangible instrument module is for receiving one or more commands from a trainee thereof for controlling, in a computer generated environment from an interactive computer simulation, a simulated vehicle in the interactive computer simulation;

The display system is for displaying rendered images of the computer generated environment comprising a visual element having associated therewith pre-defined visual characteristics comprising a visual contouring.

The processor module, comprising the dedicated graphics unit, upon loading the visual element for display at the interactive computer simulation station, dynamically modifies the one or more pre-identified distinctive visual characteristics of the visual element considering at least a relative directional vector between the simulated vehicle and the visual element in the computer generated environment, the relative directional vector being determined by the processor module in real-time during execution of the interactive computer simulation prior to rendering the visual element by the dedicated graphics unit.

In certain embodiments, the processor module dynamically modifies the one or more pre-identified distinctive visual characteristics of the visual element by associating a highlighting three-dimensional mesh with the visual element to highlight the one or more pre-identified distinctive visual characteristics of the visual element.

The processor module may further dynamically affect a visual contouring of the visual element considering at least one of a distance factor between the simulated vehicle and the visual element in the computer generated environment and a relative contrast between the pre-defined visual characteristics of the visual element and underlying computer generated environment elements. The processor module dynamically may optionally affect the visual contouring of the visual element considering both the distance factor and the relative contrast. The processor module may also dynamically affect the visual contouring of the visual element considering the relative contrast by modulating a plurality of pixels surrounding the visual element for obtaining a target contrast level with the underlying computer generated environment elements. In certain embodiments, the visual contouring is provided by a hollow three-dimensional mesh associated with the visual element to increase contour thickness of the visual element. The processor module may yet also affect the visual contouring by applying one or more tailoring parameters determined considering at least one of an identity of the trainee and an identifier of the visual element. The one or more tailoring parameters may optionally further be applied when the processor module dynamically modifies the one or more pre-identified distinctive visual characteristics of the visual element.

In certain embodiments, the processor module dynamically modifies the one or more pre-identified distinctive visual characteristics of the visual element by applying one or more tailoring parameters determined considering at least one of an identity of the trainee and an identifier of the visual element.

In certain embodiments, the one or more tailoring parameters identify, considering the identity of the trainee, the one or more pre-identified distinctive visual characteristics of the visual element from a plurality of visual characteristics thereof. in additional or alternately, the one or more tailoring parameters may specify, considering the identifier of the visual element of the trainee, an advancement value for one or more abilities of the trainee related to detection of the visual element, orientation determination for the visual element, approximate range determination for the visual element and identification of the visual element.

In accordance with a first aspect in a third set of embodiments of the present invention, a method for dynamically modifying, in an interactive computer simulation station, visual rendering of a visual element in a computer generated environment from an interactive computer simulation is provided. Pre-defined visual characteristics are associated with the visual element. The method comprises receiving, via a tangible instrument module, one or more commands from a trainee of the interactive computer simulation station for controlling, in the computer generated environment, a simulated vehicle of the interactive computer simulation. the method also comprises, upon loading the visual element for display at the interactive computer simulation station, dynamically affecting the visual element by enhancing at least one of a visual contouring of the visual element and one or more pre-identified distinctive visual characteristics of the visual element. Dynamically affecting the visual element is performed by applying one or more tailoring parameters determined considering at least one of an identity of the trainee in the interactive computer simulation station and an identifier of the visual element. Dynamically affecting the visual element by applying the one or more tailoring parameters is performed in real-time during execution of the interactive computer simulation prior to rendering the visual element for display.

In certain embodiments, the one or more tailoring parameters identify, considering the identity of the trainee, the one or more pre-identified distinctive visual characteristics of the visual element from a plurality of visual characteristics thereof. in additional or alternately, the one or more tailoring parameters may specify, considering the identifier of the visual element of the trainee, an advancement value for one or more abilities of the trainee related to detection of the visual element, orientation determination for the visual element, approximate range determination for the visual element and identification of the visual element.

The method may optionally further comprise dynamically affecting a visual contouring of the visual element considering at least one of a distance factor between the simulated vehicle and the visual element in the computer generated environment and a relative contrast between the pre-defined visual characteristics of the visual element and underlying computer generated environment elements. Dynamically affecting the visual contouring of the visual element may optionally be performed considering both the distance factor and the relative contrast. Dynamically affecting the visual contouring of the visual element considering the relative contrast may optionally comprise modulating a plurality of pixels surrounding the visual element for obtaining a target contrast level with the underlying computer generated environment elements. The visual contouring may optionally be provided by a hollow three-dimensional mesh associated with the visual element to increase contour thickness of the visual element.

The method may further optionally comprise modifying at least one of the pre-defined visual characteristics of the visual element considering a relative directional vector between the simulated vehicle and the visual element in the computer generated environment and/or one or more pre-identified distinctive visual characteristics of the visual element. Modifying at least one of the pre-defined visual characteristics of the visual element may further optionally be performed by associating a highlighting three-dimensional mesh with the visual element to highlight the one or more pre-identified distinctive visual characteristics of the visual element.

In accordance with a second aspect in the third set of embodiments of the present invention, an interactive computer simulation station is provided. The interactive computer simulation station comprises a tangible instrument module, a display system and a processor module comprising a dedicated graphics unit.

The tangible instrument module is for receiving one or more commands from a trainee thereof for controlling, in a computer generated environment from an interactive computer simulation, a simulated vehicle in the interactive computer simulation.

The display system is for displaying rendered images of the computer generated environment comprising a visual element;

The processor module, comprising a dedicated graphics unit, upon loading the visual element for display at the interactive computer simulation station, dynamically affects the visual element by enhancing at least one of a visual contouring of the visual element and one or more pre-identified distinctive visual characteristics of the visual element. The processor module dynamically affects the visual element by applying one or more tailoring parameters determined considering at least one of an identity of the trainee in the interactive computer simulation station and an identifier of the visual element. The processor module dynamically affects the visual element by applying the one or more tailoring parameters in real-time during execution of the interactive computer simulation prior to rendering the visual element by the dedicated graphics unit.

The one or more tailoring parameters may identify, considering the identity of the trainee, the one or more pre-identified distinctive visual characteristics of the visual element from a plurality of visual characteristics thereof. The one or more tailoring parameters may also specify, considering the identifier of the visual element of the trainee, an advancement value for one or more abilities of the trainee related to detection of the visual element, orientation determination for the visual element, approximate range determination for the visual element and identification of the visual element.

The processor module may further dynamically affect a visual contouring of the visual element considering at least one of a distance factor between the simulated vehicle and the visual element in the computer generated environment and a relative contrast between the pre-defined visual characteristics of the visual element and underlying computer generated environment elements. The processor module dynamically may optionally affect the visual contouring of the visual element considering both the distance factor and the relative contrast. The processor module may also dynamically affect the visual contouring of the visual element considering the relative contrast by modulating a plurality of pixels surrounding the visual element for obtaining a target contrast level with the underlying computer generated environment elements. In certain embodiments, the visual contouring is provided by a hollow three-dimensional mesh associated with the visual element to increase contour thickness of the visual element.

The processor module may further modify at least one of the pre-defined visual characteristics of the visual element considering at least one of a relative directional vector between the simulated vehicle and the visual element in the computer generated environment and one or more pre-identified distinctive visual characteristics of the visual element. The processor module may further optionally modify the at least one of the pre-defined visual characteristics of the visual element by associating a highlighting three-dimensional mesh with the visual element to highlight the one or more pre-identified distinctive visual characteristics of the visual element.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
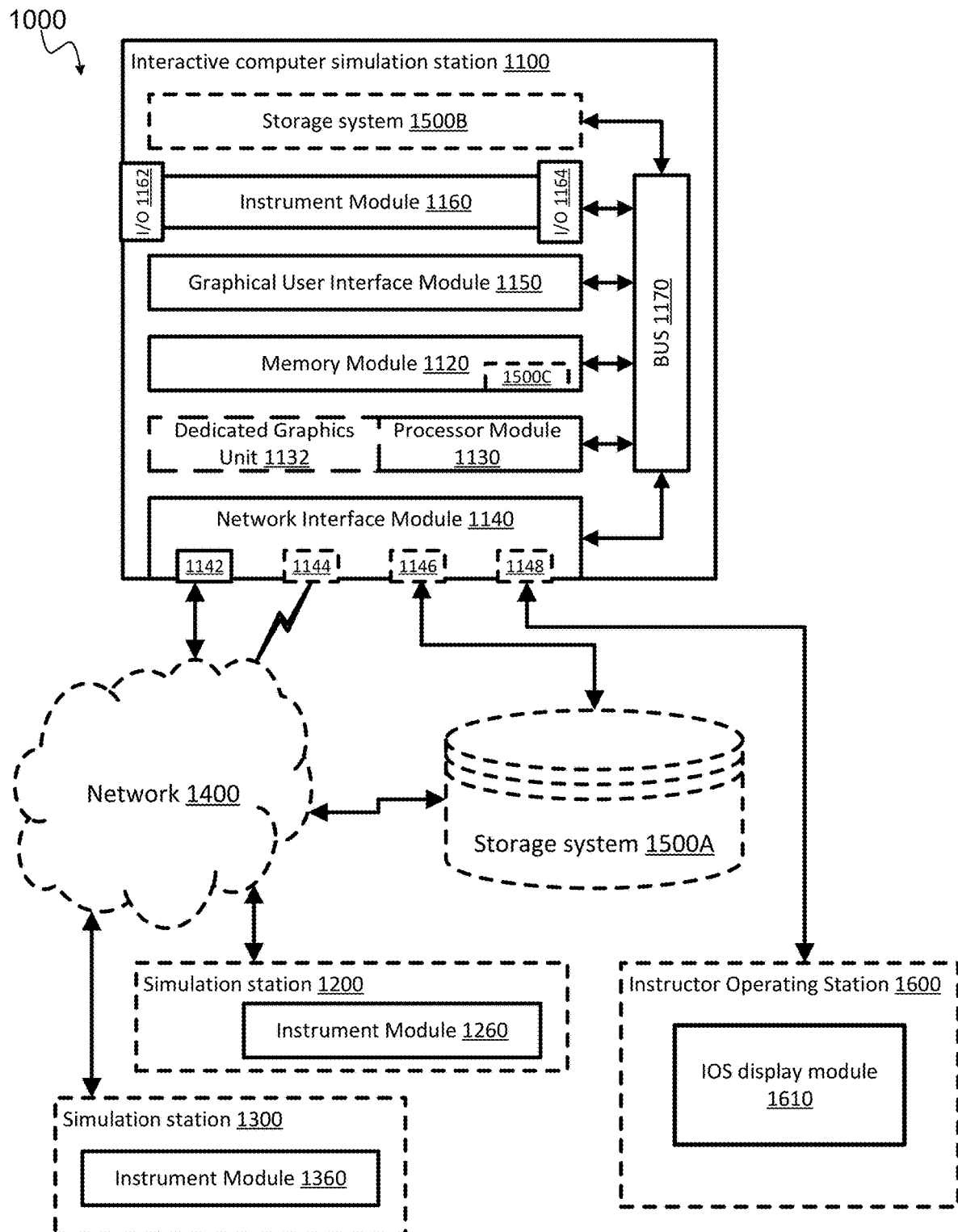
FIG. 1 is a modular representative of an exemplary interactive computer simulation system in accordance with the teachings of the present invention.
Figure 2:
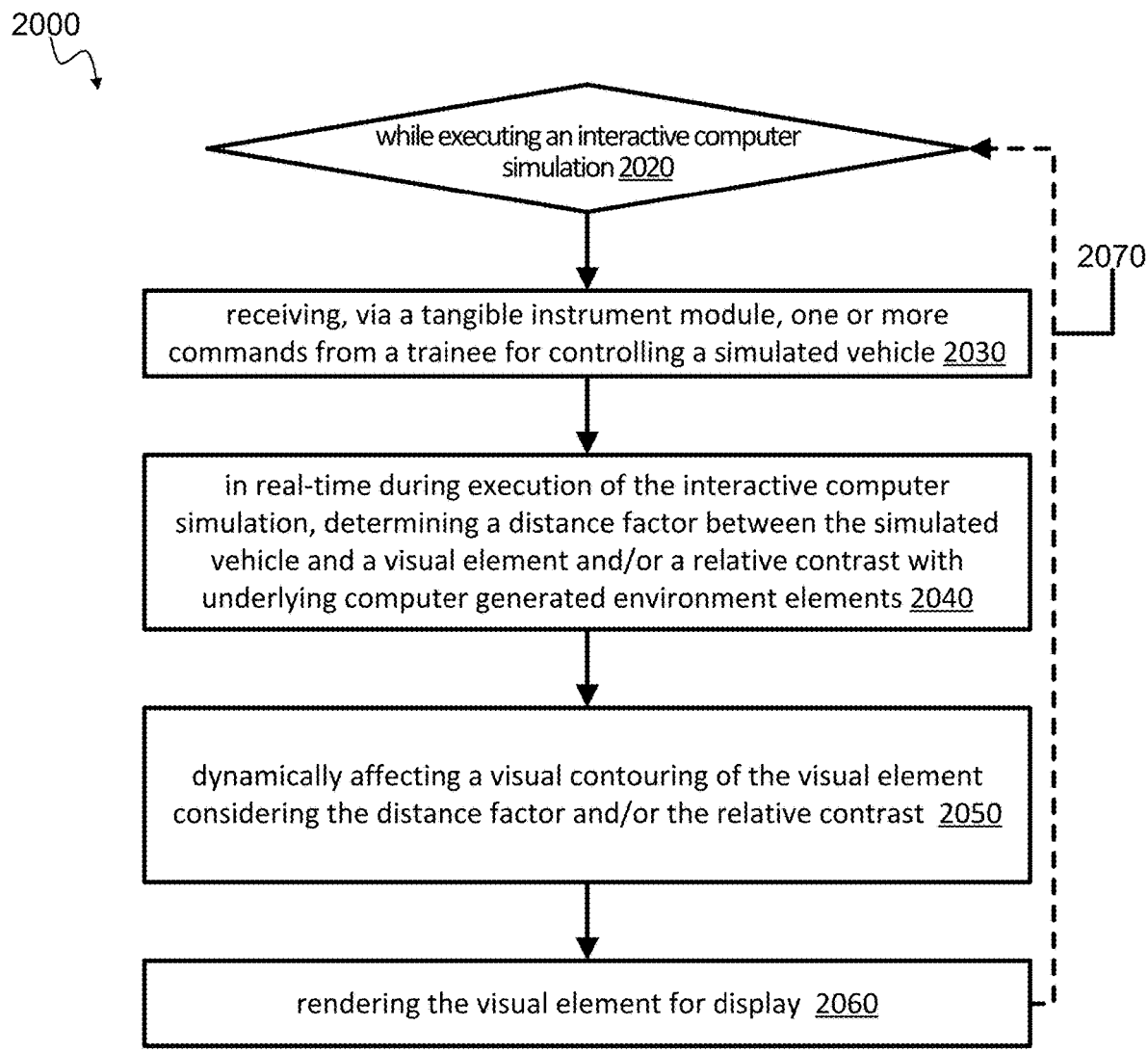
FIG. 2 is a flow chart of an exemplary method in accordance with a first set of embodiments.
Figure 3:
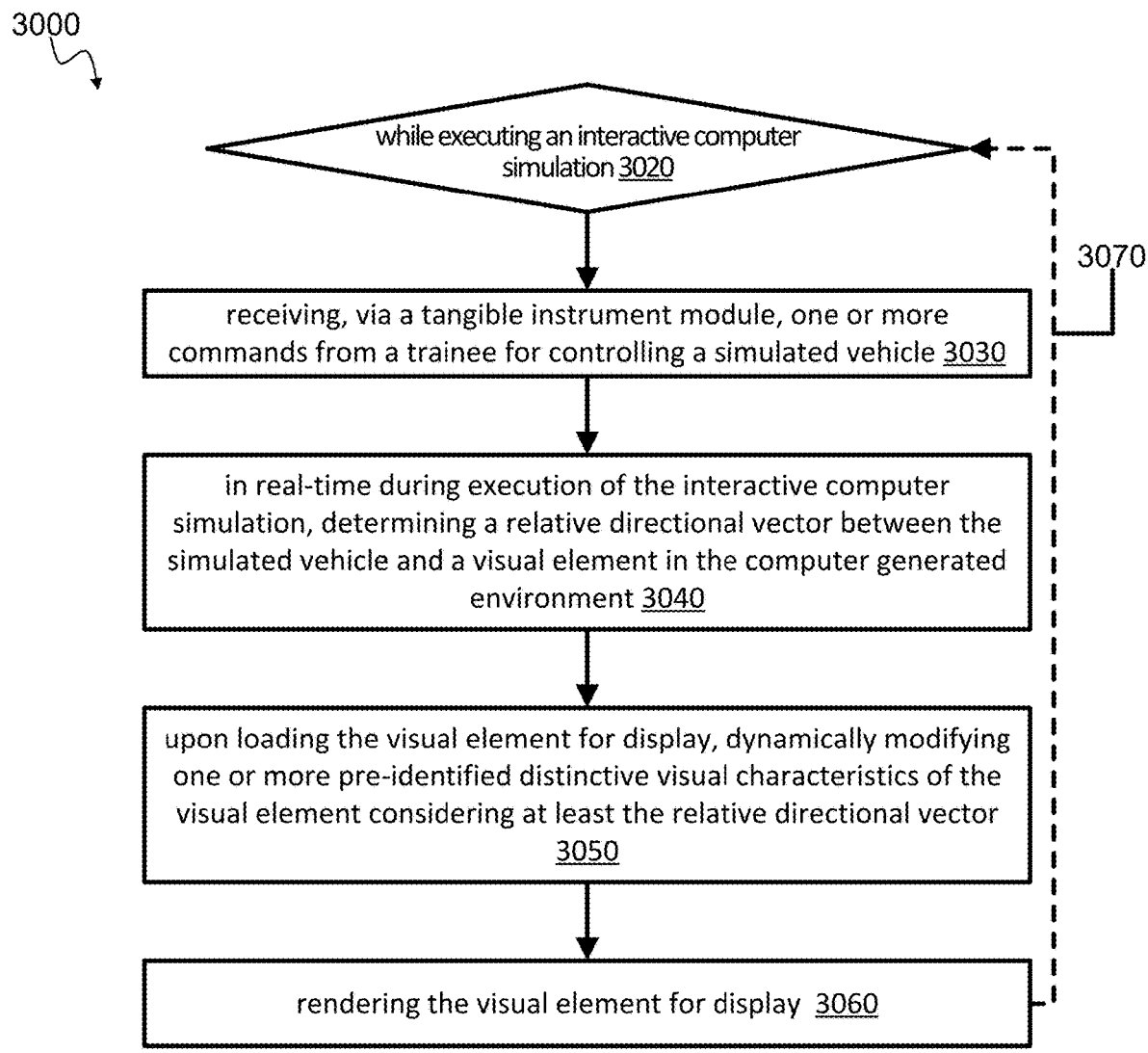
FIG. 3 is a flow chart of an exemplary method in accordance with a second set of embodiments.
Figure 4:
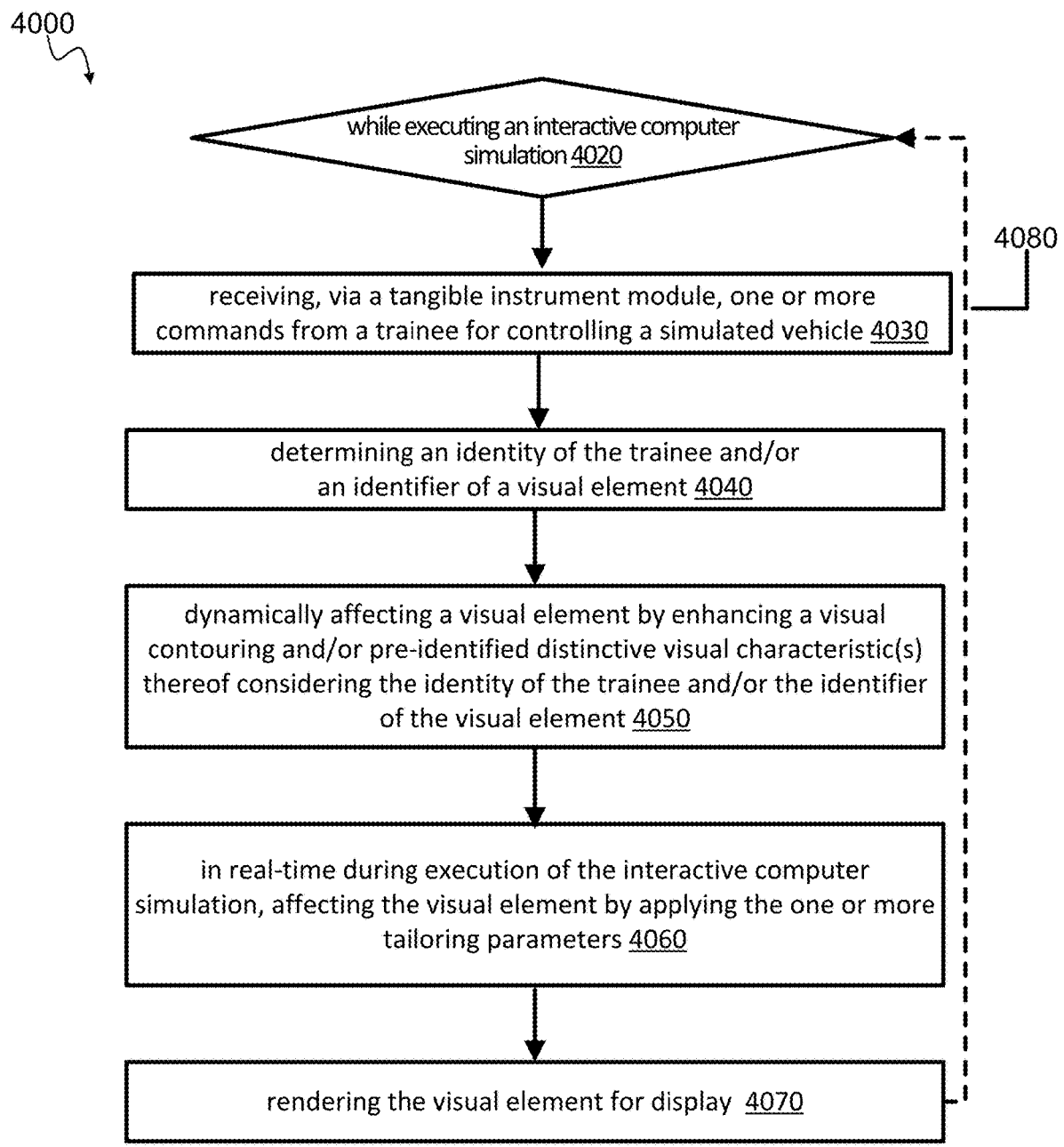
FIG. 4 is a flow chart of an exemplary method in accordance with a third set of embodiments.
Figure 5A:
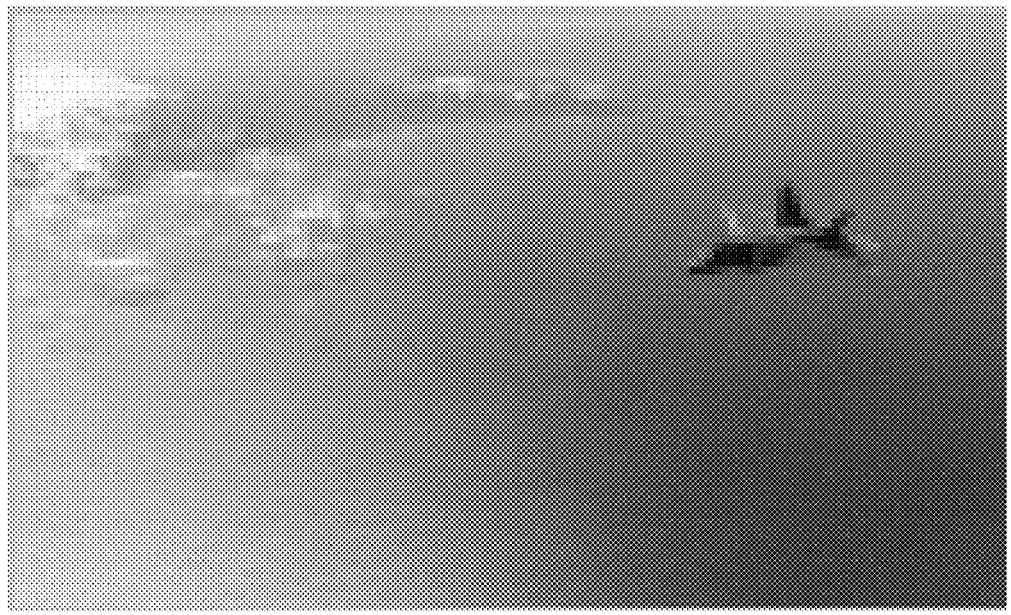
FIGS. 5A to 5D, herein after referred to as FIG. 5, are exemplary depictions of selected features related to the first, the second and/or the third sets of exemplary embodiments wherein an exemplary visual element is presented at different levels of resolutions.
Figure 5B:
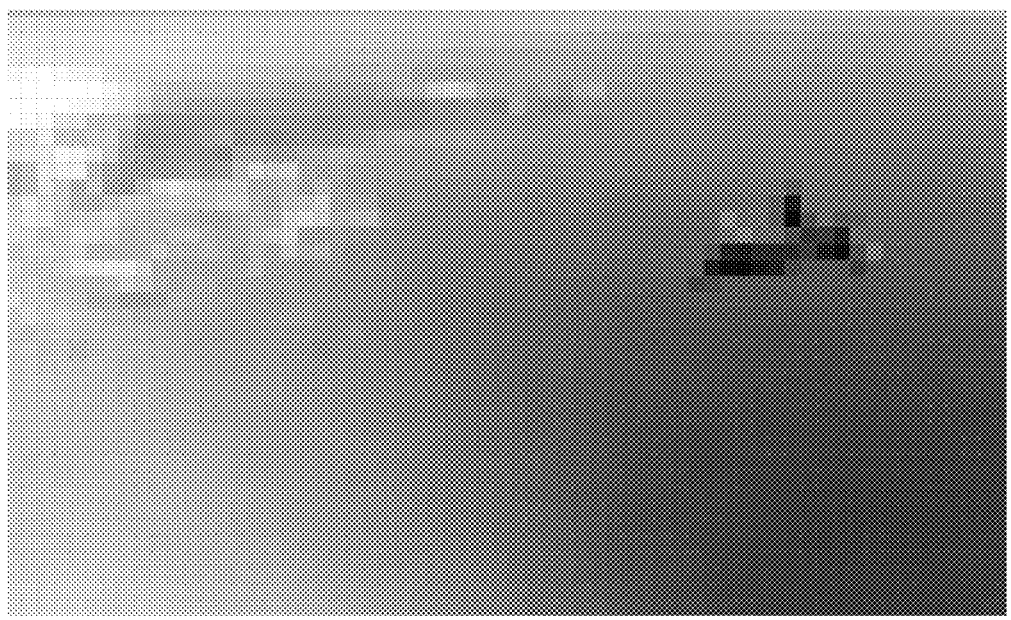
Figure 5C:
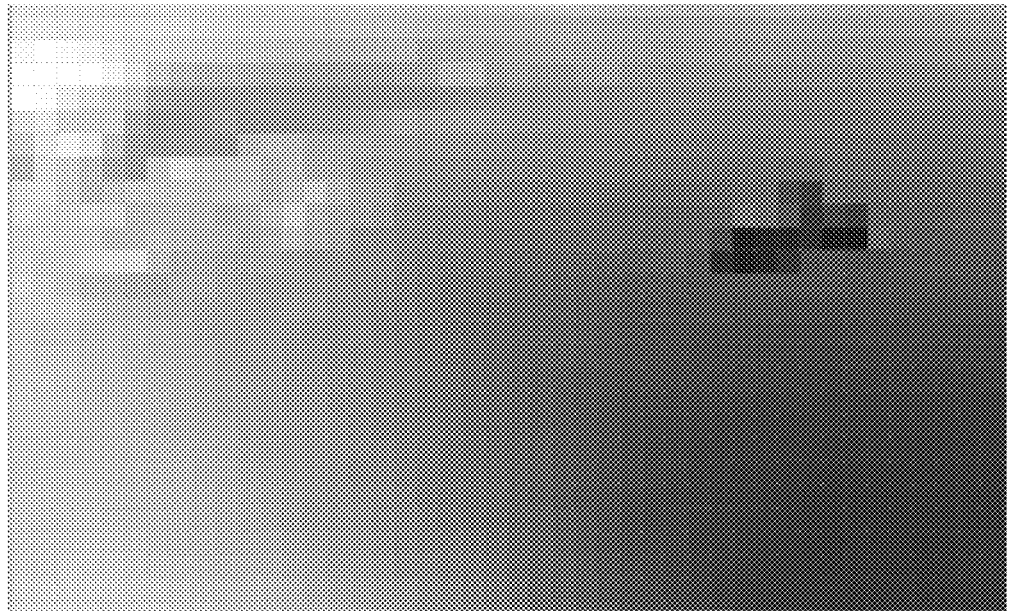
Figure 5D:
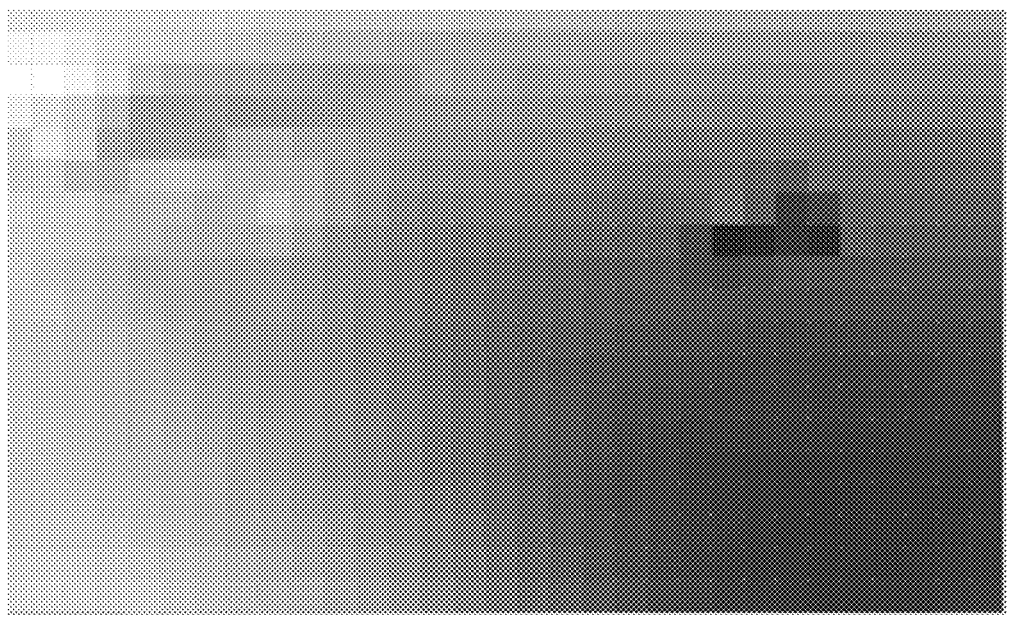

Development of the different embodiments of the present invention has been triggered by, among other things, comments made by pilots training in interactive computer flight simulation stations when performing a Detection-Orientation-Range-Identification (DORI) benchmark test. Many of them feel that the resolution of the visual imaging systems from the interactive computer simulation station is lower than the perceived resolution when flying in an actual aircraft. It is acknowledged that many pilots in training have particularly high visual acuity, which serves them well.

Different solutions have been proposed to perfect the current system, including using one or more dedicated target projectors with higher resolution. This generally, however, causes a higher level of brightness of the visual element images against the background light thus reducing the details of the visual element and reducing the accuracy of the simulation as well as the visual impact of the training. The addition of hardware components also means, among other drawbacks, limited scalability and greater exposure to failures. Another solution explored include increasing sharpness of the displayed image throughout the display panel, which creates artefacts that disturb the user and fail to provide the required level of immersivity. It has also been attempted to magnify a portion of the image that contains the visual element, but it failed to properly but this solution also creates artefacts that disturb the user and fail to provide the required level of immersivity.

As mentioned previously, the benchmark is meant to provide a correlation between a trainee's ability as measured and developed in the interactive computer simulation and the actual trainee's ability in the actual systems. An additional benefit to be sought, in certain circumstances, is to adapt the benchmark to the capacity of the trainee in order to build the required abilities over time.

It is important to note that the present invention relates to modification/enhancement of images rendered in the context of an interactive computer simulation for which the characteristics of the visual element to be modified/enhanced are well known by the underlying computer simulation system. That is to say that the challenges answered by the present invention do not relate to the proper tracking and positioning of the visual element in an existing image (e.g., from a video feed or pre-rasterized), but by the proper onscreen-depiction of the visual element considering various factors determined in the context of the interactive computer simulation, at least one of the various factors being determined in real-time (or real-time priority processing) during execution of the interactive computer simulation.

Once looking for a solution to the aforementioned issues, different cooperating, yet potentially independent solutions have been developed and are highlighted below. The skilled person will readily acknowledge that features described in the context of one of the embodiments of the invention can be adapted and used in the context of the other embodiments.

In a first set of embodiments, a dynamic visual element contouring computer graphics system and related method is provided. The visual element (e.g., target object) is dynamically defined based on requirements (e.g., time of the day) of the training session. Contours of the visual element are modified by modulation, e.g., emphasized considering the training session's requirements (e.g., to a desired level). In some embodiments, for each visual element, a hollow three-dimensional mesh is used as an attribute to increase the thickness of the contours. Characteristic visual features of the visual element may also be emphasized depending on the requirements of the training session. The contours and/or visual features of the visual element may also be parameterized considering one or more dynamic aspects of the interactive computer simulation (e.g., one or more of identity of the trainee, previously measured skills of the trainee, identification of the visual element, relative colors of the visual element, etc.)

In a second set of embodiments, a dynamic visual element modifying computer graphics system and related method is provided. The visual element (e.g., target object) is dynamically defined based on requirements (e.g., nature of the visual element) of the training session. Characteristic visual features of the visual element are modified before rendering, e.g., physical structure of the visual element emphasized considering the training session's requirements. In some embodiments, for each visual element, a three-dimensional mesh is used as an attribute to modify the visual element's physical characteristics. Contours of the visual element may also be modified by modulation depending on the training session's requirement. The contours and/or characteristics of the visual element may also be parameterized considering one or more dynamic aspects of the interactive computer simulation (e.g., one or more of identity of the trainee, previously measured skills of the trainee, identification of the visual element, relative colors of the visual element, etc.)

In a third set of embodiments, a parameterized dynamic visual element adapting computer graphics system and related method is provided. The visual element (e.g., target object) is defined based on dynamic parameters of the training session (e.g., one or more of identity of the trainee, previously measured skills of the trainee, identification of the visual element, relative colors of the visual element, etc.). Contours and/or visual features of the visual element are adapted before rendering considering status of the training session. In some embodiments, for each visual element, a three-dimensional mesh is used as an attribute to dynamically adjust the visual element's contours and/or characteristic visual features. For instance, contours of the visual element may be modified by modulation while characteristic visual features of the visual element may be emphasized depending on the requirements of the training session.

The three different sets of embodiments present features that may advantageously be used together, as skilled persons will readily recognize, but that may also be used independently. Examples provided hereinafter should be considered to be an exhaustive list of the various permutations of features that are otherwise presented herein.

Reference is now made to the drawings in which FIG. 1 shows a logical modular representation of an exemplary interactive computer simulation system 1000 performing one or more interactive computer simulations (such as interactive flight, land and/or marine simulations), in accordance with the teachings of the present invention. The interactive computer simulation system 1000 comprises an interactive computer simulation station 1100, which may be involved in one or more of the interactive computer simulations.

In the depicted example of FIG. 1, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation (e.g., between 5 and 60 or even 120 images rendered per seconds or maximum between 8.3 ms and 200 ms for each rendered image). In some embodiments, each of the simulation stations 1100, 1200, 1300 comprise a processor module having a dedicated graphics processing unit similar to the dedicated graphics processing unit 1132. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the interactive computer simulation station 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the interactive computer simulation station 1100. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the interactive computer simulation station 1100 to perform routine as well as innovative steps related to the present invention.

The interactive computer simulation station 1100 also comprises a Graphical User Interface (GUI) module 1150 comprising one or more display screen(s) forming a display system, for the interactive computer simulation station 1100. The display screens of the GUI module 1150 could be split into one or more flat panels, but could also be a single flat or curved screen visible from an expected user position (not shown) in the simulation computing device. For instance, the GUI module 1150 may comprise one or more mounted projectors for projecting images on a curved refracting screen. The curved refracting screen may be located far enough from the user of the interactive computer program to provide a collimated display. Alternatively, the curved refracting screen may provide a non-collimated display. Skilled person will readily understand that the GUI module 1150 may be used in a variety of contexts not limited to the previously mentioned examples (e.g., rear projector on translucent screen, front projector or regular screen, wearable display system, etc.).

The interactive computer simulation system 1000 comprises a storage system 1500 that comprises data related to a shared computer generated environment and that may further log dynamic data while the interactive computer simulation is performed. FIG. 1 shows examples of the storage system 1500 as a distinct database system 1500A, a distinct module 1500B of the interactive computer simulation station 1100 or a sub-module 1500C of the memory module 1120 of the interactive computer simulation station 1100. The storage system 1500 may also comprise storage modules (not shown) on the simulation stations 1200, 1300. The storage system 1500 may be distributed over different systems A, B, C and/or the simulations stations 1100, 1200, 1300 or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140. The variants of storage system 1500 usable in the context of the present invention will be readily apparent to persons skilled in the art.

An Instructor Operating Station (IOS) 1600 may be provided for allowing various management tasks to be performed in the interactive computer simulation system 1000. The tasks associated with the IOS 1600 allow for control and/or monitoring of one or more ongoing interactive computer simulations. For instance, the IOS 1600 may be used for allowing an instructor to participate to the interactive computer simulation and possibly additional interactive computer simulation(s). In some embodiments, the IOS 1600 may be provided by the interactive computer simulation station 1100. In other embodiments, the IOS 1600 may be co-located with the interactive computer simulation station 1100 (e.g., within the same room or simulation enclosure) or remote therefrom (e.g., in different rooms or in different locations). Skilled persons will understand the many instances of the IOS 1600 may be concurrently provided in the interactive computer simulation system 1000. The IOS 1600 may provide a computer simulation management interface, which may be displayed on a dedicated IOS display module 1610 or the GUI module 1150. The IOS 1600 could be located in close proximity with the simulation computing device, but may also be provided outside of the interactive computer simulation station 1100, in communication therewith.

The IOS display module 1610 may comprise one or more display screens such as a wired or wireless flat screen, a wired or wireless touch-sensitive display, a tablet computer, a portable computer or a smart phone. When multiple interactive computer simulation station 1100, 1200 and/or 1300 are present in the computer system 1000, the IOS 1600 may present different views of the computer program management interface (e.g., to manage different aspects therewith) or they may all present the same view thereof. The computer program management interface may be permanently shown on a first of the screens of the IOS display module 1610 while a second of the screen of the IOS display module 1610 shows a view of the interactive computer simulation (i.e., adapted view considering the second screen from images displayed through the GUI module 1150). The computer program management interface may also be triggered on the IOS 1600, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation computing device. A virtualized IOS (not shown) may also be provided to the user on the GUI module 1150 (e.g., on a main screen, on a secondary screen or a dedicated screen thereof). In some embodiments, a Brief and Debrief System (BDS) may also be provided. The BDS may be seen as a version of the IOS 1600 used during playback of recorded data only.

In certain embodiments, the IOS 1600 may be used, e.g., by the instructor in order to fulfill certain objectives of a particular simulation or training scenario, to insert or modify a visual element (e.g., add a target aircraft, change the aircraft from one type to another (e.g., different manufacturer or different allegiance), etc.) and/or to modify the behavior of a visual element (e.g., modify the direction of an aircraft, modify armament status of an aircraft, etc.). One or more of the visual elements displayed through the GUI module 1500 may represent other simulated elements (e.g., a simulated aircraft controlled from the simulation station 1200). In addition, or alternatively, one or more of the visual elements displayed through the GUI module 1500 may follow a predefined behavioral pattern (e.g., controlled using artificial intelligence), in line with objectives of a particular simulation or training scenario.

The tangible instrument provided by the instrument modules 1160, 1260 and/or 1360 are tightly related to the element being simulated. In the example of the simulated aircraft system, for instance in relation to an exemplary flight simulator embodiment, the instrument module 1160 may comprise a control yoke and/or side stick, rudder pedals, a throttle, a flap switch, a transponder, a landing gear lever, a parking brake switch, aircraft instruments (air speed indicator, attitude indicator, altimeter, turn coordinator, vertical speed indicator, heading indicator, . . . ), etc. Depending on the type of simulation (e.g., level of immersivity), the tangible instruments may be more or less realistic compared to those that would be available in an actual aircraft. For instance, the tangible instrument provided by the modules 1160, 1260 and/or 1360 may replicate an actual aircraft cockpit where actual instruments found in the actual aircraft or physical interfaces having similar physical characteristics are provided to the user (or trainee). As previously described, the actions that the user or trainee takes with one or more of the tangible instruments provided via the instrument module(s) 1160, 1260 and/or 1360 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160, 1260 and/or 1360 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training, marine simulator for lookout training, etc.), skilled persons will readily recognize and be able to apply its teachings to other types of interactive computer simulations.

In some embodiment, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the interactive computer simulation station 1100. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the interactive computer simulation station 1100 and/or the simulation station(s) 1200, 1300 (e.g., a tangible instrument exactly as the one that would be found in the actual system subject of the interactive simulation). The internal input/output (1/0) module 1162 of the instrument module 1160, 1260 and/or 1360 may connect one or more tangible instruments integrated with the instrument module 1160, 1260 and/or 1360. The 1/0 1162 may comprise necessary interface(s) to exchange data, set data or get data from such integrated tangible instruments. The internal 1/0 module 1162 may be required, for instance, for interfacing the interactive computer simulation system 1000 with one or more integrated tangible instrument identical to an Original Equipment Manufacturer (OEM) part (e.g., a tangible instrument exactly as the one that would be found in the actual system subject of the interactive simulation). The I/O 1162 may comprise necessary interface(s) to exchange data, set data or get data from such integrated tangible instruments.

The instrument module 1160 may comprise one or more physical module that may further be interconnected to provide a given configuration of the interactive computer program. As can be readily understood, instruments of the instrument module 1160 are expected to be manipulated by the user of the interactive computer simulation to input commands thereto.

The instrument module 1160 may yet also comprise a mechanical instrument actuator (not shown) providing one or more mechanical assemblies for physically moving one or more of the tangible instruments of the instrument module 1160 (e.g., electric motors, mechanical dampeners, gears, levers, etc.). The mechanical instrument actuator may receive one or more sets of instructions (e.g., from the processor module 1130) for causing one or more of the instruments to move in accordance with a defined input function. The mechanical instrument actuator of the instrument module 1160 may also alternatively or in addition be used for providing feedback (e.g., visual, haptic, . . . ) to the user of the interactive computer simulation through tangible and/or simulated instrument(s) (e.g., touch screens, or replicated elements of an aircraft cockpit or of an operating room). Additional feedback devices may be provided with the interactive computer simulation station 1100 or in the interactive computer simulation system 1000 (e.g., vibration of an instrument, physical movement of a seat of the user and/or physical movement of the whole system, etc.).

The interactive computer simulation station 1100 may also comprise one or more seats (not shown) or other ergonomically designed tools (not shown) to assist the user of the interactive computer simulation in getting into proper position to gain access to some or all of the instrument module 1160.

In the depicted example of FIG. 1, the interactive computer simulation system 1000 shows optional interactive computer simulation stations 1200, 1300, which may communicate through the network 1400 with the interactive computer simulation station 1100. The stations 1200, 1300 may be associated to the same instance of the interactive computer simulation with a shared computer generated environment where users of the interactive computer simulation station 1100 and stations 1200, 1300 may interact with one another in a single simulation. The single simulation may also involve other simulation computing device(s) (not shown) co-located with the simulation computing device or remote therefrom. The simulation computing device and stations 1200, 1300 may also be associated with different instances of the interactive computer simulation, which may further involve other simulation computing device(s) (not shown) co-located with the interactive computer simulation station 1100 or remote therefrom.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real-time or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Likewise, in an interactive simulation having a frame rate of 120 frames per second, it is expected that a modification performed within 10 to 20 frames will appear seamless to the user. Skilled persons will readily recognize that real-time processing may not actually be achievable in absolutely all circumstances in which rendering images is required. The real-time priority processing required for the purpose of the disclosed embodiments relates to perceived quality of service by the user of the interactive computer simulation, and does not require absolute real-time processing of all dynamic events, even if the user was to perceive a certain level of deterioration of quality of service that would still be considered plausible.

A simulation network (e.g., overlaid on the network 1400) may be used, at runtime (e.g., using real-time priority processing or processing priority that the user perceives as real-time), to exchange information (e.g., event-related simulation information). For instance, movements of a vehicle associated to the interactive computer simulation station 1100 and events related to interactions of a user of the interactive computer simulation station 1100 with the interactive computer generated environment may be shared through the simulation network. Likewise, simulation-wide events (e.g., related to persistent modifications to the interactive computer generated environment, lighting conditions, modified simulated weather, etc.) may be shared through the simulation network from a centralized computer system (not shown) or from one of the stations 1100, 1200, 1300. In addition, the storage module 1500 (e.g., a networked database system) accessible to all components of the interactive computer simulation system 1000 involved in the interactive computer simulation may be used to store data necessary for rendering interactive computer generated environment. In some embodiments, the storage module 1500 is only updated from the centralized computer system and the simulation computing device and stations 1100, 1200, 1300 only load data therefrom.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the manner in which the different modules exchange information between them. For instance, the memory module and the processor module could be connected by a parallel bus, but could also be connected by a serial connection or involve an intermediate module (not shown) without affecting the teachings of the present invention.

Figure 6:
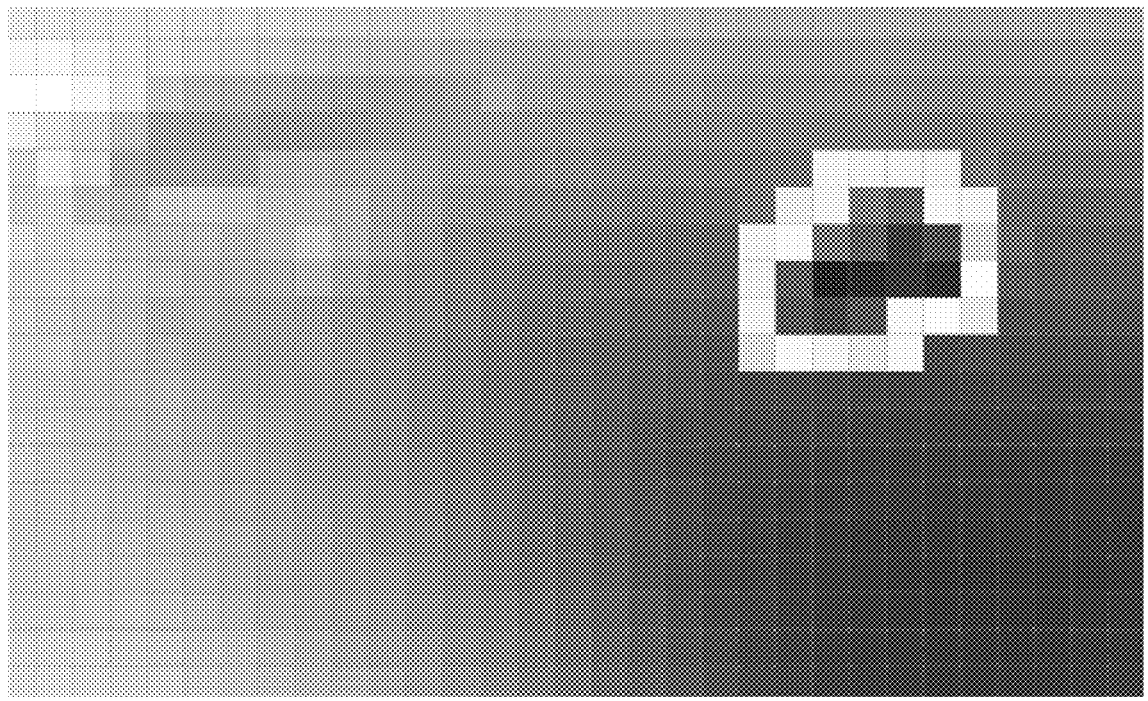
FIG. 6 is a depiction of an exemplary dynamic visual contouring where pixels surrounding the visual element are modulated method in accordance with exemplary embodiments.

FIG. 5A, FIG. 5B, FIG. 5C and FIG. 5D, hereinafter referred to as FIG. 5, present an exemplary visual element (e.g., an airplane) at different levels of resolutions. In the different levels of resolutions, the same visual element is depicted as perceived from different distances from the position of a virtual camera in the interactive computer environment. As such, depending on the distance, more or less pixels will be available to depict the visual element. An example of dynamic visual contouring where pixels surrounding the visual element are modulated is presented in FIG. 6. In the example depicted in FIG. 7, FIG. 8 and FIG. 9, additional visual information is provided with the visual element. The additional visual information may, in certain embodiments, be associated with the visual element using a hollow 3D mesh. The additional visual information may also, in certain embodiments, be associated with the visual element by modifying the 3D mesh of the visual element and/or by associating an additional metadata structure therewith that contains sufficient data to display the additional visual information (e.g., the additional visual information itself or the data to allow the processor module 1130 and/or dedicated unit 1132 to display the additional visual information. On FIG. 7, the nose (N), tail (T), right wing (R) and left wing (L) are identified. Of course, other visual information could be added, whether textual or not (e.g., red and/or green points to represent the wings, etc.). On FIG. 8 and FIG. 9, different examples of directional indication arrows are depicted (e.g., over and in front of the visual element). The size of the arrow could be modified considering the relative distance and/or the relative speed of the visual element with the simulated vehicle. FIG. 10A and FIG. 10B exemplified enhancement of specific characteristics of a visual element (e.g., the nose of the plane, the tail of the plane, etc.) to facilitate identification thereof In the example of FIG. 10, the size of the visual characteristics is modified. Skilled persons will understand that, alternatively or in addition, colors and/or brightness of the visual characteristics may also be affected. The manner in which the visual characteristics is modified may be defined considering an identity of the trainee, an identifier of the visual element and/or display capabilities of the simulation station. For instance, some trainees (e.g., because of individual characteristics or because of their role) may have or be expected to have a certain level of accuracy for certain visual elements compared to others. It is therefore possible, in certain embodiments, to vary the visual characteristics being modified and/or the extent of the modification based on who the trainee is and/or the role of the trainee. The development objective for the trainee may also be considered (e.g., simulated scenarios built to enhanced development of the capabilities). Likewise, some visual elements may require a varying degree of modification depending on their distinctive visual characteristics (e.g., airplanes at large or certain specific models, aircraft carriers, water trails from boat movements, etc.). The relative direction of the visual element (if applicable) may also be considered to determine the visual characteristics to be modified and/or to determine the extent of the modification to be made to the visual characteristics (e.g., an incoming or an outgoing moving element, relative speed (getting closer of farther) of the element, etc.). In the example of the visual element being an airplane, it might be that the closest distinctive visual characteristics is selectively enhanced (e.g., the nose for an incoming plane or the tail for an outgoing plane or vice-versa and/or the wings for a perpendicular movement, etc.).

Referring concurrently to FIGS. 1, 2 and 5 to 10, in accordance with the first set of embodiments, a method 2000 is presented for dynamically modifying visual rendering of a visual element in a computer generated environment from an interactive computer simulation. The method 2000 is performed 2020 in an interactive computer simulation station 1100 during execution of the interactive computer simulation (e.g., by the processor module 1130 using the memory module 1120). Pre-defined visual characteristics comprising a visual contouring are associated with the visual element. For instance, the visual element may be an airplane 3D mesh which, once rendered for display, could be presented on screen as depicted in FIG. 5. As one example, the visual contouring may be provided by a hollow three-dimensional (3D) mesh associated with the visual element to increase contour thickness of the visual element.

The method 2000 comprises receiving 2030, via a tangible instrument module 1160, one or more commands from a trainee of the interactive computer simulation station 1100 for controlling, in the computer generated environment, a simulated vehicle of the interactive computer simulation. The simulated vehicle may be an aircraft, but may also be a terrestrial or marine vehicle. The method 2000 then comprises, at the interactive computer simulation station 1100 and during execution of the interactive computer simulation, dynamically affecting 2050 the visual contouring of the visual element considering at least one of a distance factor between the simulated vehicle and the visual element in the computer generated environment and a relative contrast between the pre-defined visual characteristics of the visual element and underlying computer generated environment elements. On the example of FIG. 5, it can be seen that the contrast between the visual element and the underlying computer generated environment elements is dependent upon the simulated element itself (e.g., colors and shape), but also on the number of pixels used to depict the simulated element. The distance factor and the relative contrast are determined 2040 in real-time during execution of the interactive computer simulation prior to rendering 2060 the visual element for display. In some embodiments, dynamically affecting 2050 the visual contouring of the visual element is performed considering both the distance factor and the relative contrast. The method 2000 is repeated 2070 as needed, e.g., for multiple visual elements for the interactive computer simulation.

In certain embodiments, dynamically affecting 2050 the visual contouring of the visual element is performed for the visual element when the visual element enters a minimum visual range from the simulated element in the interactive computer simulation. In some other embodiments, dynamically affecting 2050 the visual contouring of the visual element may be performed when loading the visual element for display at the interactive computer simulation station. The minimum visual range may be defined considering an identity of the trainee, an identifier of the visual element and/or display capabilities of the simulation station. For instance, some trainees (e.g., because of individual characteristics or because of their role) may have or be expected to have a visual acuity that is particularly good (or poor), which could be considered for determining when to begin depicting the visual element on screen. It is therefore possible, in certain embodiments, to vary the visual range based on who the trainee is and/or the role of the trainee. The development objective for the trainee may also be considered (e.g., simulated scenarios built to enhanced development of the capabilities). Likewise, some visual elements may require a varying visual range depending on their expected visual characteristics (e.g., airplanes at large or certain specific models, aircraft carriers, water trails from boat movements, etc.). The interactive computer simulation station 1000 itself may impose constraints on the visual range, e.g., because of maximum resolution of the display system used therein.

Similarly to a minimum visual range, the method 2000 may also stop from performing the dynamic contouring of the visual element when the visual element exits a maximum enhancement range from the simulated element in the interactive computer simulation. Again, the maximum enhancement range may be defined considering an identity of the trainee, an identifier of the visual element and/or display capabilities of the simulation station. For instance, some trainees (e.g., because of individual characteristics or because of their role) may have or be expected to have a visual acuity that is particularly good (or poor), which could be considered for determining when to stop enhancing the visual element on screen. It is therefore possible, in certain embodiments, to vary the maximum enhancement range based on who the trainee is and/or the role of the trainee. The development objective for the trainee may also be considered (e.g., simulated scenarios built to enhanced development of the capabilities). Likewise, some visual elements may require a varying maximum enhancement range depending on their expected visual characteristics (e.g., airplanes at large or certain specific models, aircraft carriers, water trails from boat movements, etc.).

Dynamically affecting 2050 the visual contouring of the visual element considering the relative contrast may, in certain embodiments, be performed by modulating a plurality of pixels surrounding the visual element for obtaining a target contrast level with the underlying computer generated environment elements. An example of such dynamic visual contouring where pixels surrounding the visual element are modulated is presented in FIG. 6. Of course, skilled person will readily understand that the modulation would typically be performed in a multicolor environment and that variation of color, with or without variation of intensity, may be used to increase the contrast between the visual element and the underlying computer generated environment elements.

In certain embodiments, the method 2000 also comprises modifying at least one of the pre-defined visual characteristics of the visual element considering one or more pre-identified distinctive visual characteristics of the visual element. For instance, as depicted in FIG. 10a and FIG. 10B, specific characteristics of a visual element may be enhanced (e.g., the nose of the plane, the tail of the plane, etc.) to facilitate identification thereof In the example of FIG. 10, the size of the visual characteristics is modified. Skilled persons will understand that, alternatively or in addition, colors and/or brightness of the visual characteristics may also be affected. The manner in which the visual characteristics is modified may be defined considering an identity of the trainee, an identifier of the visual element and/or display capabilities of the simulation station. For instance, some trainees (e.g., because of individual characteristics or because of their role) may have or be expected to have a certain level of accuracy for certain visual elements compared to others. It is therefore possible, in certain embodiments, to vary the visual characteristics being modified and/or the extent of the modification based on who the trainee is and/or the role of the trainee. The development objective for the trainee may also be considered (e.g., simulated scenarios built to enhanced development of the capabilities). Likewise, some visual elements may require a varying degree of modification depending on their distinctive visual characteristics (e.g., airplanes at large or certain specific models, aircraft carriers, water trails from boat movements, etc.). The relative direction of the visual element (if applicable) may also be considered to determine the visual characteristics to be modified and/or to determine the extent of the modification to be made to the visual characteristics (e.g., an incoming or an outgoing moving element, relative speed (getting closer of farther) of the element, etc.). In the example of the visual element being an airplane, it might be that the closest distinctive visual characteristics is selectively enhanced (e.g., the nose for an incoming plane or the tail for an outgoing plane or vice-versa and/or the wings for a perpendicular movement, etc.).

Figure 7:
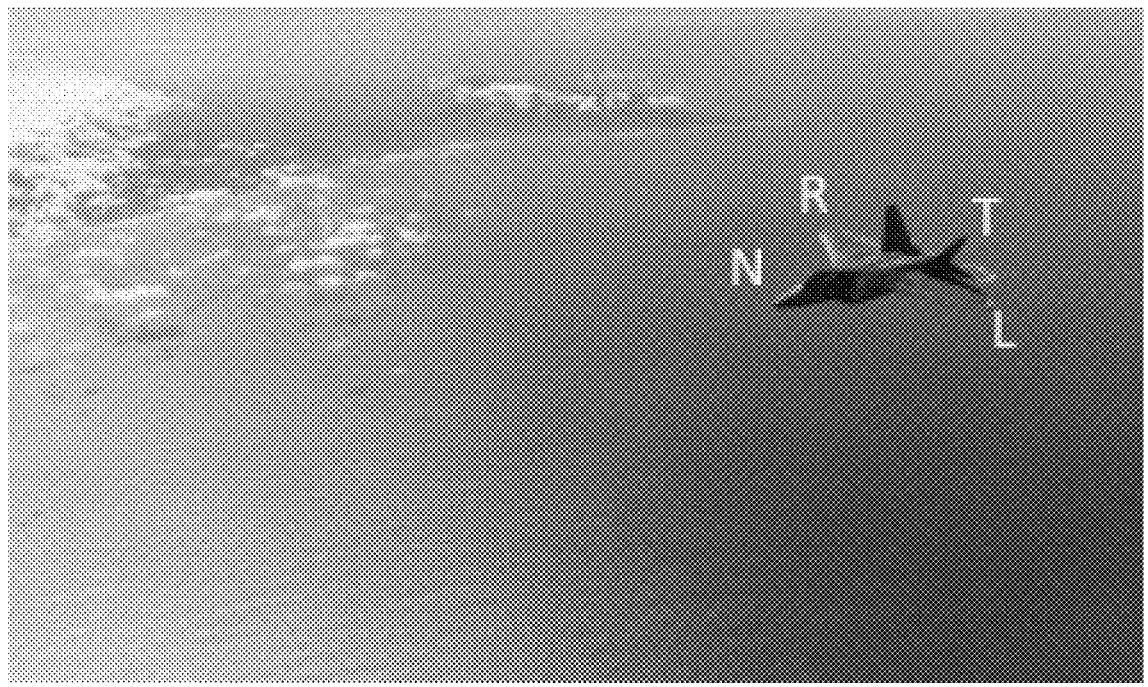
FIG. 7, FIG. 8 and FIG. 9 are depictions of exemplary visual elements where additional visual information is provided therewith in accordance with exemplary embodiments.
Figure 8:
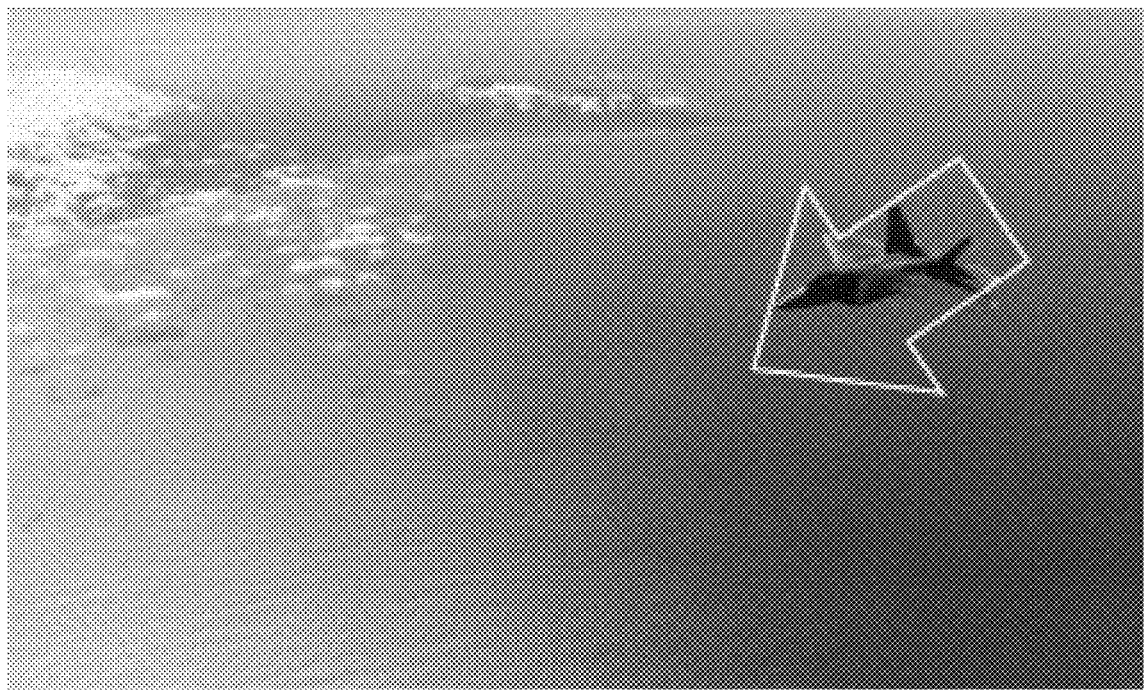
Figure 9:
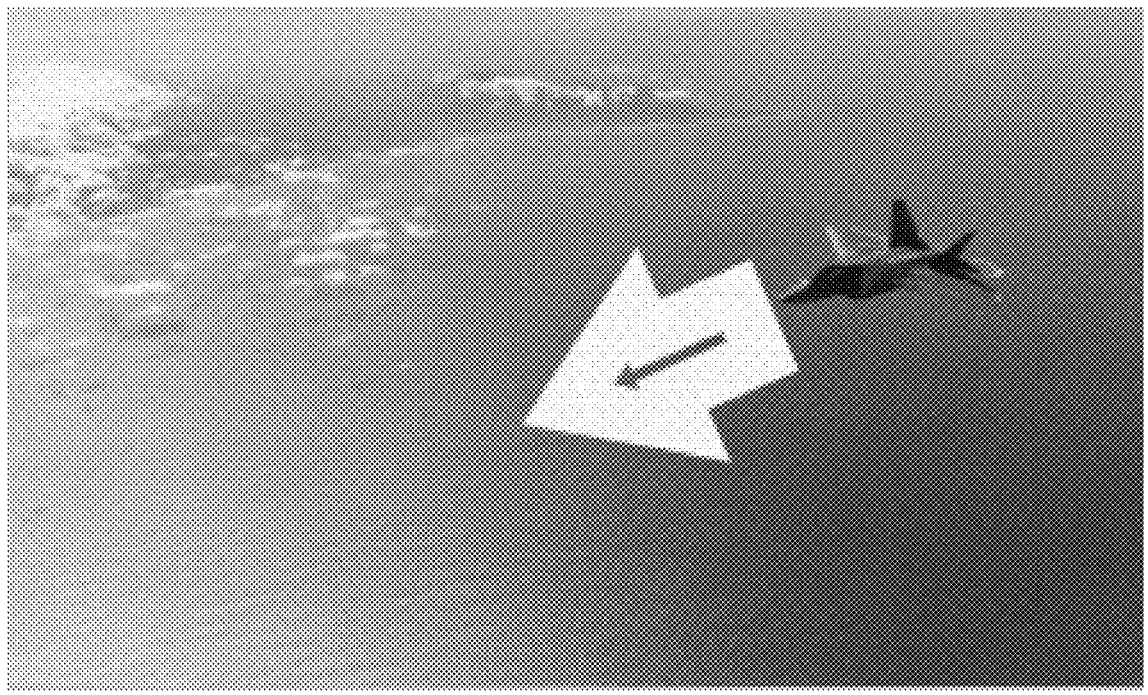
Figure 10A:
FIG. 10A and FIG. 10B, herein after referred to as FIG. 10, exemplify enhancement of specific characteristics of a visual element in accordance with exemplary embodiments.
Figure 10B:

In the example depicted in FIG. 7, FIG. 8 and FIG. 9, additional visual information is provided with the visual element. The additional visual information may, in certain embodiments, be associated with the visual element using a hollow 3D mesh. The additional visual information may also, in certain embodiments, be associated with the visual element by modifying the 3D mesh of the visual element and/or by associating an additional metadata structure therewith that contains sufficient data to display the additional visual information (e.g., the additional visual information itself or the data to allow the processor module 1130 and/or dedicated unit 1132 to display the additional visual information. On FIG. 7, the nose (N), tail (T), right wing (R) and left wing (L) are identified. Of course, other visual information could be added, whether textual or not (e.g., red and/or green points to represent the wings, etc.). On FIG. 8 and FIG. 9, different examples of directional indication arrows are depicted (e.g., over and in front of the visual element). The size of the arrow could be modified considering the relative distance and/or the relative speed of the visual element with the simulated vehicle.

Referring concurrently to FIGS. 1, 3 and 5 to 10, in accordance with the second set of embodiments, a method 3000 is depicted for dynamically modifying, in an interactive computer simulation station, visual rendering of a visual element in a computer generated environment from an interactive computer simulation. The method 3000 is performed 3020 in an interactive computer simulation station 1100 during execution of the interactive computer simulation (e.g., by the processor module 1130 using the memory module 1120). One or more pre-identified distinctive visual characteristics are associated with the visual element. The method 3000 comprises receiving 3030, via a tangible instrument module 1160, one or more commands from a trainee of the interactive computer simulation station for controlling, in the computer generated environment, a simulated vehicle of the interactive computer simulation. The method 3000 also comprises, at the interactive computer simulation station and during execution of the interactive computer simulation, dynamically modifying 3050 the one or more pre-identified distinctive visual characteristics of the visual element considering at least a relative directional vector between the simulated vehicle and the visual element in the computer generated environment. The relative directional vector being determined 3040 in real-time during execution of the interactive computer simulation prior to rendering 3060 the visual element for display. The method 3000 is repeated 3070 as needed for multiple visual elements for the interactive computer simulation.

Dynamically modifying 3050 the one or more pre-identified distinctive visual characteristics of the visual element may be performed for the visual element when the visual element enters a minimum visual range from the simulated element in the interactive computer simulation and/or stopped from being performed when the visual element exits a maximum enhancement range from the simulated element in the interactive computer simulation. In some other embodiments, dynamically modifying 3050 the one or more pre-identified distinctive visual characteristics of the visual element may be performed when loading the visual element for display at the interactive computer simulation station. The minimum visual range and/or maximum enhancement range may be defined considering an identity of the trainee, an identifier of the visual element and/or display capabilities of the simulation station. For instance, some trainees (e.g., because of individual characteristics or because of their role) may have or be expected to have a visual acuity that is particularly good (or poor), which could be considered for determining when to begin and/or stop depicting the visual element on screen. It is therefore possible, in certain embodiments, to vary the range(s) based on who the trainee is and/or the role of the trainee. The development objective for the trainee may also be considered (e.g., simulated scenarios built to enhanced development of the capabilities). Likewise, some visual elements may require a varying range depending on their expected visual characteristics (e.g., airplanes at large or certain specific models, aircraft carriers, water trails from boat movements, etc.). The interactive computer simulation station 1000 itself may impose constraints on the visual range, e.g., because of maximum resolution of the display system used therein.

Dynamically modifying 3050 the one or more pre-identified distinctive visual characteristics of the visual element may be performed, in certain embodiments, by associating a highlighting three-dimensional mesh with the visual element to highlight the one or more pre-identified distinctive visual characteristics of the visual element.

The method 3000 may further comprise, in certain embodiments, dynamically affecting a visual contouring of the visual element considering a distance factor between the simulated vehicle and the visual element in the computer generated environment and/or a relative contrast between the pre-defined visual characteristics of the visual element and underlying computer generated environment elements. Dynamically affecting the visual contouring of the visual element considering the relative contrast may comprise modulating a plurality of pixels surrounding the visual element for obtaining a target contrast level with the underlying computer generated environment elements. The visual contouring may be provided by a hollow three-dimensional mesh associated with the visual element to increase contour thickness of the visual element. Affecting the visual contouring may be performed by applying one or more tailoring parameters determined considering at least one of an identity of the trainee and an identifier of the visual element. The one or more tailoring parameters may further be applied when dynamically modifying 3050 the one or more pre-identified distinctive visual characteristics of the visual element is performed.

Dynamically modifying 3050 the one or more pre-identified distinctive visual characteristics of the visual element may be performed by applying one or more tailoring parameters determined considering at least one of an identity of the trainee and an identifier of the visual element.

Referring concurrently to FIGS. 1 and 4 to 10, in accordance with the third set of embodiments, a method 4000 for dynamically modifying, in an interactive computer simulation station, visual rendering of a visual element in a computer generated environment from an interactive computer simulation is exemplified. The method 4000 is performed 4020 in an interactive computer simulation station 1100 during execution of the interactive computer simulation (e.g., by the processor module 1130 using the memory module 1120). Pre-defined visual characteristics are associated with the visual element. The method 4000 comprises receiving 4030, via a tangible instrument module 1160, one or more commands from a trainee of the interactive computer simulation station 1100 for controlling, in the computer generated environment, a simulated vehicle of the interactive computer simulation. the method 4000 also comprises, at the interactive computer simulation station 1100 and during execution 4020 of the interactive computer simulation, dynamically affecting 4050 the visual element by enhancing at least one of a visual contouring of the visual element and one or more pre-identified distinctive visual characteristics of the visual element. Dynamically affecting 4050 the visual element is performed by applying one or more tailoring parameters determined 4040 considering at least one of an identity of the trainee in the interactive computer simulation station and an identifier of the visual element. Dynamically affecting 4050 the visual element by applying the one or more tailoring parameters is performed in real-time during execution 4060 of the interactive computer simulation prior to rendering 4070 the visual element for display. The method 4000 is repeated 4080 as needed for multiple visual elements for the interactive computer simulation.

The one or more tailoring parameters may identify, considering the identity of the trainee, the one or more pre-identified distinctive visual characteristics of the visual element from a plurality of visual characteristics thereof.

Dynamically affecting 4050 the visual element may be performed for the visual element when the visual element enters a minimum visual range from the simulated element in the interactive computer simulation and/or stopped from being performed when the visual element exits a maximum enhancement range from the simulated element in the interactive computer simulation. In some other embodiments, affecting 4050 the visual element may be performed for the visual element may be performed when loading the visual element for display at the interactive computer simulation station. The minimum visual range and/or maximum enhancement range may be defined considering an identity of the trainee, an identifier of the visual element and/or display capabilities of the simulation station. For instance, some trainees (e.g., because of individual characteristics or because of their role) may have or be expected to have a visual acuity that is particularly good (or poor), which could be considered for determining when to begin and/or stop depicting the visual element on screen. It is therefore possible, in certain embodiments, to vary the range(s) based on who the trainee is and/or the role of the trainee. The development objective for the trainee may also be considered (e.g., simulated scenarios built to enhanced development of the capabilities). Likewise, some visual elements may require a varying range depending on their expected visual characteristics (e.g., airplanes at large or certain specific models, aircraft carriers, water trails from boat movements, etc.). The interactive computer simulation station 1000 itself may impose constraints on the visual range, e.g., because of maximum resolution of the display system used therein.

The one or more tailoring parameters may specify, considering the identifier of the visual element of the trainee, an advancement value for one or more abilities of the trainee related to detection of the visual element, orientation determination for the visual element, approximate range determination for the visual element and identification of the visual element.

In some embodiments, dynamically affecting 4050 the visual contouring of the visual element considering a distance factor between the simulated vehicle and the visual element in the computer generated environment and/or a relative contrast between the pre-defined visual characteristics of the visual element and underlying computer generated environment elements. Dynamically affecting the visual contouring of the visual element considering the relative contrast comprises modulating a plurality of pixels surrounding the visual element for obtaining a target contrast level with the underlying computer generated environment elements. The visual contouring may be provided by a hollow three-dimensional mesh associated with the visual element to increase contour thickness of the visual element.

Modifying at least one of the pre-defined visual characteristics of the visual element may be performed considering at least one of a relative directional vector between the simulated vehicle and the visual element in the computer generated environment and one or more pre-identified distinctive visual characteristics of the visual element. Modifying at least one of the pre-defined visual characteristics of the visual element may be performed by associating a highlighting three-dimensional mesh with the visual element to highlight the one or more pre-identified distinctive visual characteristics of the visual element.

In a fourth set of embodiments, the first, second and third sets of embodiments are modified to train a user in a fixed simulate system (vs. a simulate vehicle) that needs to train in identification of a remote visual element (e.g., an air traffic controller in a control tower training to identify incoming and/or grounded airplanes). The challenges are similar concerning the visual element without having to consider movement of the simulated vehicle controlled from the interactive computer simulation station. Still, while no movement is involved, the trainee in the fixed simulated system still has an instrument module that the trainee uses to interact with the interactive computer simulation.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for dynamically modifying, in an interactive computer simulation station, a visual rendering of a visual element in a computer-generated environment from an interactive computer simulation, wherein pre-defined visual characteristics comprising a visual contouring are associated with the visual element, the method comprising:
   receiving, via a tangible instrument module, one or more commands from a trainee of the interactive computer simulation station for controlling, in the computer-generated environment, a simulated vehicle of the interactive computer simulation; and
   at the interactive computer simulation station and during execution of the interactive computer simulation, dynamically affecting the visual contouring of the visual element considering at least one of:
      a distance factor between the simulated vehicle and the visual element in the computer-generated environment; and
      a relative contrast between the pre-defined visual characteristics of the visual element and underlying computer-generated environment elements;
   wherein the distance factor and the relative contrast are determined in real-time during execution of the interactive computer simulation prior to rendering the visual element for display.

2. The method of claim 1, wherein dynamically affecting the visual contouring of the visual element is performed considering both the distance factor and the relative contrast.

3. The method of claim 1, wherein dynamically affecting the visual contouring of the visual element is performed for the visual element when the visual element enters a minimum visual range from a simulated element in the interactive computer simulation.

4. The method of claim 3, wherein the minimum visual range is defined considering at least one of an identity of the trainee, an identifier of the visual element and display capabilities of the simulation station.

5. The method of claim 1, wherein dynamically affecting the visual contouring of the visual element stops from being performed when the visual element exits a maximum enhancement range from a simulated element in the interactive computer simulation.

6. The method of claim 1, wherein dynamically affecting the visual contouring of the visual element considering the relative contrast comprises modulating a plurality of pixels surrounding the visual element for obtaining a target contrast level with the underlying computer-generated environment elements.

7. The method of claim 1, wherein the visual contouring is provided by a hollow three-dimensional mesh associated with the visual element to increase contour thickness of the visual element.

8. The method of claim 1, further comprising modifying at least one of the pre-defined visual characteristics of the visual element considering at least one of:
a relative directional vector between the simulated vehicle and the visual element in the computer-generated environment and;
one or more pre-identified distinctive visual characteristics of the visual element.

9. The method of claim 8, wherein modifying at least one of the pre-defined visual characteristics of the visual element is performed by associating a highlighting three-dimensional mesh with the visual element to highlight the one or more pre-identified distinctive visual characteristics of the visual element.

10. The method of claim 8, wherein modifying the at least one of the pre-defined visual characteristics of the visual element is performed by applying one or more tailoring parameters determined considering at least one of an identity of the trainee and an identifier of the visual element, wherein the one or more tailoring parameters are applied when dynamically affecting the visual contouring of the visual element is performed.

11. The method of claim 1, wherein dynamically affecting the visual contouring of the visual element is performed by applying one or more tailoring parameters determined considering at least one of an identity of the trainee and an identifier of the visual element.

12. An interactive computer simulation station comprising:
a tangible instrument module for receiving one or more commands from a trainee thereof for controlling, in a computer-generated environment from an interactive computer simulation, a simulated vehicle in the interactive computer simulation;
a display system for displaying rendered images of the computer-generated environment comprising a visual element having associated therewith pre-defined visual characteristics comprising a visual contouring;
a processor module, comprising a dedicated graphics unit for, that during execution of the interactive computer simulation:
dynamically affecting the visual contouring of the visual element during execution of the interaction computer simulation considering at least one of:
a distance factor between the simulated vehicle and the visual element in the computer-generated environment; and
a relative contrast between the pre-defined visual characteristics of the visual element and underlying computer-generated environment elements;
wherein the processor module is configured to determine the distance factor and the relative contrast in real-time during execution of the interactive computer simulation prior to rendering the visual element by the dedicated graphics unit.

13. The interactive computer simulation station of claim 12, wherein the processor module is configured to dynamically affect the visual contouring of the visual element considering both the distance factor and the relative contrast.

14. The interactive computer simulation station of claim 12, wherein the processor module is configured to dynamically affect the visual contouring of the visual element for the visual element when the visual element enters a minimum visual range from a simulated element in the interactive computer simulation.

15. The interactive computer simulation station of claim 14, wherein the minimum visual range is defined considering at least one of an identity of the trainee, an identifier of the visual element and display capabilities of the simulation station.

16. The interactive computer simulation station of claim 12, wherein the processor module is configured to stop dynamically affecting the visual contouring of the visual element when the visual element exits a maximum enhancement range from a simulated element in the interactive computer simulation.

17. The interactive computer simulation station of claim 12, wherein the processor module is configured to dynamically affect the visual contouring of the visual element considering the relative contrast by modulating a plurality of pixels surrounding the visual element for obtaining a target contrast level with the underlying computer-generated environment elements.

18. The interactive computer simulation station of claim 12, wherein the visual contouring is provided by a hollow three-dimensional mesh associated with the visual element to increase contour thickness of the visual element.

19. The interactive computer simulation station of claim 12, wherein the processor module is configured to further modify at least one of the pre-defined visual characteristics of the visual element considering at least one of:
a relative directional vector between the simulated vehicle and the visual element in the computer-generated environment; and
one or more pre-identified distinctive visual characteristics of the visual element.

20. The interactive computer simulation station of claim 19, wherein the processor module is configured to modify the at least one of the pre-defined visual characteristics of the visual element by applying one or more tailoring parameters determined considering at least one of an identity of the trainee and an identifier of the visual element and wherein the one or more tailoring parameters are further applied when the processor module is configured to dynamically affect the visual contouring of the visual element.

\* \* \* \* \*